(12) United States Patent
Roberts

(10) Patent No.: US 6,955,437 B1
(45) Date of Patent: Oct. 18, 2005

(54) HITCH MIRROR ASSEMBLY

(76) Inventor: Fred H. Roberts, 3635 Fairlane St., High Point, NC (US) 27265

( * ) Notice: Subject to any disclaimer, the term of this patent is extended or adjusted under 35 U.S.C. 154(b) by 0 days.

(21) Appl. No.: 10/758,342

(22) Filed: Jan. 15, 2004

(51) Int. Cl.[7] .......................... G02B 5/10; G02B 7/182; B60R 1/08
(52) U.S. Cl. ...................... 359/841; 359/872; 359/881; 248/467; 248/474; 248/480; 248/481; 248/484; 248/485
(58) Field of Search ................................ 359/841, 872, 359/881; 248/467, 469, 472, 474, 477, 479, 248/480, 481, 484, 485, 487

(56) References Cited

U.S. PATENT DOCUMENTS

| | | | |
|---|---|---|---|
| 1,063,220 A | * | 6/1913 | Seamon .................... 248/278.1 |
| 1,956,518 A | * | 4/1934 | Paulus .......................... 248/481 |
| 2,465,751 A | * | 3/1949 | Robins ......................... 248/481 |
| 2,573,443 A | * | 10/1951 | Holland ...................... 248/480 |
| 2,845,000 A | * | 7/1958 | Morley ........................ 248/481 |
| 3,205,777 A | * | 9/1965 | Brenner ....................... 248/480 |
| 3,295,914 A | * | 1/1967 | Dietrich ....................... 359/881 |
| 3,407,683 A | * | 10/1968 | Liedel ......................... 74/502.1 |
| 3,524,701 A | | 8/1970 | Strohmeier |
| 3,858,966 A | * | 1/1975 | Lowell, Jr. .................. 359/881 |
| 4,163,606 A | | 8/1979 | Granno |
| 4,339,104 A | | 7/1982 | Weidman |
| 4,583,481 A | | 4/1986 | Garrison |
| 4,856,888 A | * | 8/1989 | Wahl .......................... 359/881 |
| 4,905,376 A | | 3/1990 | Neeley |
| 4,925,287 A | | 5/1990 | Lord et al. |
| 4,951,913 A | | 8/1990 | Quesada |
| 5,111,342 A | | 5/1992 | Quesada |
| 5,113,588 A | | 5/1992 | Walston |
| D329,631 S | | 9/1992 | Cameron |
| D331,901 S | | 12/1992 | Monroe |
| 5,180,182 A | | 1/1993 | Haworth |
| D340,219 S | | 10/1993 | Moon |
| D344,485 S | | 2/1994 | Linne et al. |
| 5,290,056 A | | 3/1994 | Fath, IV |
| 5,309,289 A | | 5/1994 | Johnson |
| 5,313,337 A | | 5/1994 | Byers |
| 5,328,199 A | | 7/1994 | Howe |
| 5,335,930 A | | 8/1994 | Tighe |
| 5,428,484 A | | 6/1995 | Baker |
| D363,694 S | | 10/1995 | Birgel |
| 5,478,101 A | | 12/1995 | Roberson |
| 5,482,310 A | | 1/1996 | Staggs |
| 5,550,681 A | | 8/1996 | Mazarac |
| 5,625,500 A | | 4/1997 | Ackerman |
| 5,657,175 A | | 8/1997 | Brewington |
| 5,724,199 A | * | 3/1998 | Hu ............................. 359/872 |
| 5,784,213 A | | 7/1998 | Howard |
| 5,825,564 A | | 10/1998 | Mazarac |
| 5,915,825 A | | 6/1999 | Weister |
| 5,971,555 A | | 10/1999 | Wilcox et al. |
| 5,979,927 A | | 11/1999 | Hale |
| D425,001 S | | 5/2000 | Bullock |
| 6,062,697 A | * | 5/2000 | Bryant et al. ............... 359/841 |

(Continued)

Primary Examiner—Ricky D. Shafer

(57) ABSTRACT

A mirror assembly is provided for use in "hitching" trailers to towing vehicles. The mirror assembly can be used for conventional ball and socket couplings, fifth wheel couplings and variations thereof. The mirror assembly is magnetically attached to the trailer tongue so it can be easily removed after coupling. The mirror assembly includes a telescoping stanchion mirror post and a swivel joint which can be vertically rotated. A ball joint connected to the back of the mirror allows the mirror to be turned in any of a variety of positions for precise alignment during the hitching process.

10 Claims, 6 Drawing Sheets

U.S. PATENT DOCUMENTS

| | | |
|---|---|---|
| 6,076,847 A | 6/2000 | Thornton |
| 6,079,837 A | 6/2000 | Singleton |
| 6,089,590 A | 7/2000 | Bowers |
| 6,102,423 A | 8/2000 | Beck et al. |
| 6,213,608 B1 | 4/2001 | Osgood |
| 6,239,926 B1 | 5/2001 | De Shazer |
| 6,302,550 B1 * | 10/2001 | Krieg ......................... 359/879 |
| 6,422,585 B1 | 7/2002 | Glass |
| 6,446,999 B1 | 9/2002 | Davis, Jr. |
| 6,499,851 B1 | 12/2002 | Kelly et al. |
| D474,432 S | 5/2003 | Good |
| 6,619,685 B2 | 9/2003 | Teague |

* cited by examiner

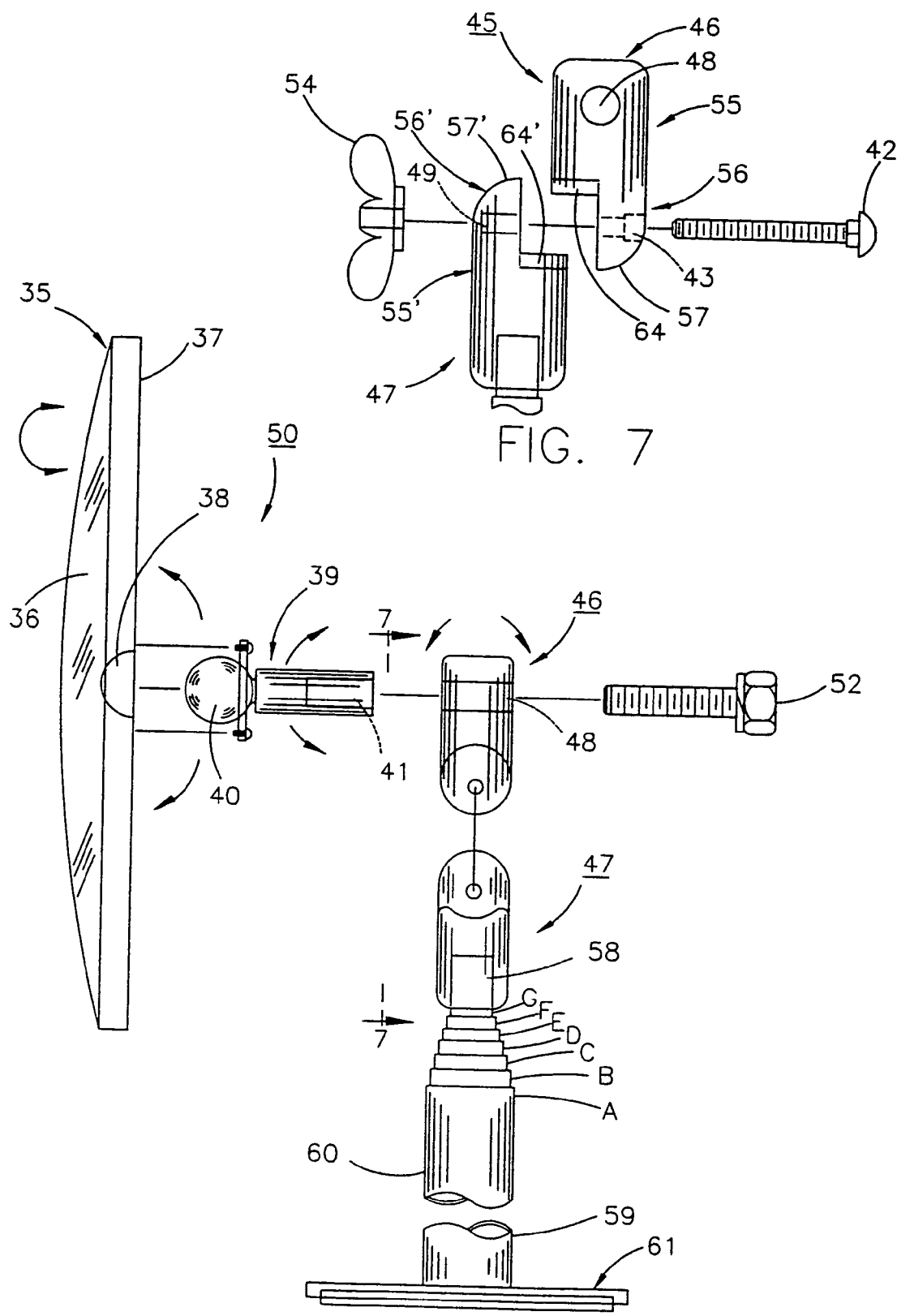

HITCH MIRROR ASSEMBLY

FIELD OF THE INVENTION

The invention herein pertains to connecting a trailer to a vehicle for towing purposes and particularly pertains to a mirror assembly to assist the driver during the connecting process.

DESCRIPTION OF THE PRIOR ART AND OBJECTIVES OF THE INVENTION

Various types of mirror assemblies have been used in the past for a trailer hook-up as shown in U.S. Pat. Nos. 3,524,701; 4,163,606; 4,583,481; 4,951,913; 5,309,289; 5,328,199; 5,979,927; 6,079,837; 6,422,585; 6,446,999; 6,499,851; D-331,901; D-340,219; D-425,001; and D-344,485.

Trailers of various types are connected or "hitched" to a towing vehicle such as a truck, van, tractor or the like. The hitching process usually consists of the trailer positioned in a convenient location with the towing vehicle driven in a rearward direction until the vehicle hitch component is contiguous to the trailer hitch component. If the first driving attempt does not provide a satisfactory alignment, the vehicle is then driven forward and then second or subsequent rearward driving attempts are made for proper alignment. Small trailers or carts which are towed can be somewhat manually manipulated for connection purposes even if the towing vehicle is somewhat improperly aligned. However, with larger or loaded trailers the manual positioning of the hitch component thereon is virtually impossible, often requiring many rearward approaches by the towing vehicle.

In order to assist the driver in his rearward approach to the trailer, various alignment devices in the past have been used including mirrors, posts, flags and the like affixed to the trailer tongue. Certain of these have been useful in particular instances with the mirror being most commonly used. However, conventional mirrors which are used for trailer hitching require adjustments to enable the driver to align the towing vehicle and trailer during backing of the vehicle. If the adjustment is incorrect or not precise, the connection attempt can be extremely difficult and frustrating. In order to provide a precise adjustment to the mirror, the mirror must be capable of easy, convenient vertical extension and vertical and horizontal rotational movement. The mirror must also be capable of withstanding slight forces from the wind and other impacts as might occur during the connection process.

With the problems and disadvantages of prior art hitch alignment devices known, the present invention was conceived and one of its objectives is to provide a mirror assembly which can be easily and conveniently, magnetically attached to a trailer tongue.

It is yet another objective of the present invention to provide a mirror assembly for attachment to a trailer tongue which includes a telescoping stanchion for adjusting the height thereof.

It is still another objective of the present invention to provide a telescoping assembly having a mirror with a ball joint for manual mirror positioning variations.

It is also an objective of the present invention to provide a mirror assembly having a wingnut for tightening or releasing a swivel joint for any of a variety of mirror positions.

Various other objectives and advantages of the present invention will become apparent to those skilled in the art as a more detailed description is set forth below.

SUMMARY OF THE INVENTION

The aforesaid and other objectives are realized by providing a mirror assembly which can be readily attached to a metal trailer tongue or other structure by magnetic forces. Inexperienced vehicle operators can manually position or move the mirror apparatus quickly in place and can remove the mirror assembly from the trailer tongue after connection in an efficient manner. After mounting, the telescoping mirror assembly is extended to a suitable height and by releasing a single wingnut, the mirror can be vertically rotated or directed into alignment with the rearview mirror of the towing vehicle. A final fine sight adjustment can be made to the mirror assembly by a ball joint attached at the rear of the mirror. The ball joint allows both vertical and horizontal movement of the mirror so that the mirror can be precisely aligned for enhanced sight of the vehicle and trailer hitch components during the towing vehicle's movement in a rearward direction towards the trailer.

BRIEF DESCRIPTION OF THE DRAWINGS

FIG. 6 shows an enlarged fragmented side view of the preferred mirror assembly in exploded fashion; and FIG. 7 demonstrates an enlarged front view of the swivel joint seen in FIG. 6.

DETAILED DESCRIPTION OF THE PREFERRED EMBODIMENT AND OPERATION OF THE INVENTION

Figure 1:
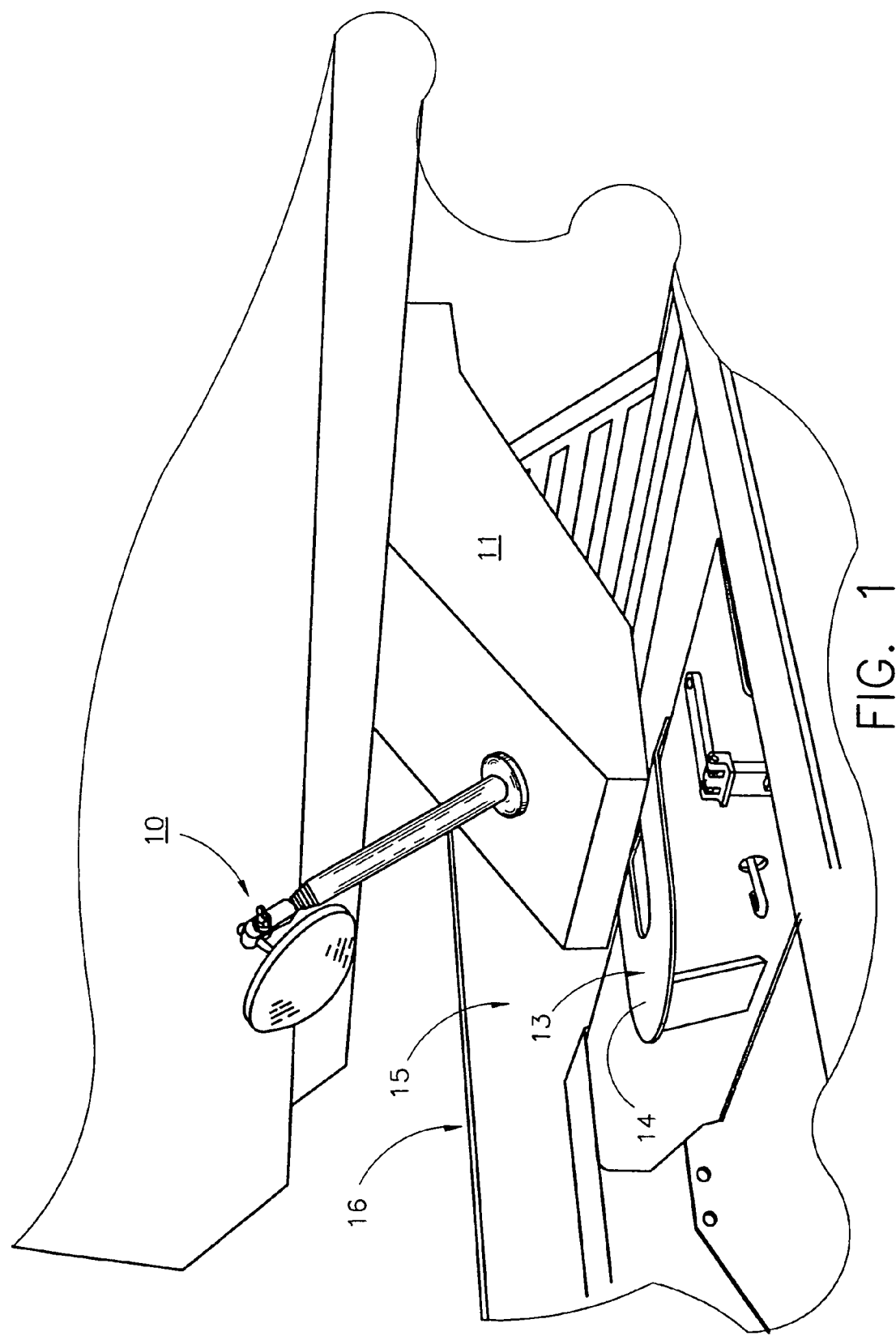
FIG. 1 shows in schematic representation the mirror assembly of the invention positioned on a trailer coupling mechanism for a fifth wheel plate located in a pickup truck bed.
Figure 2:
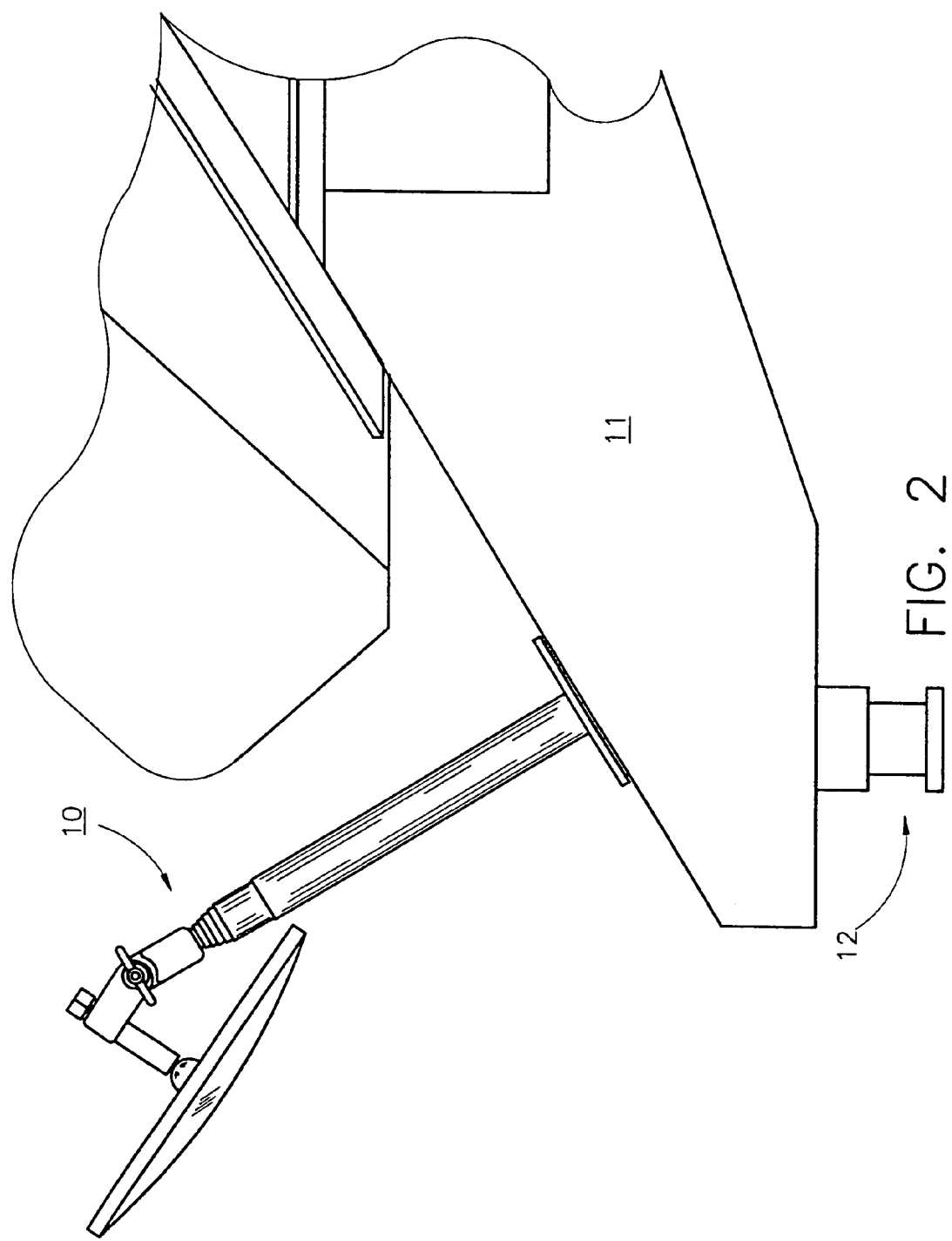
FIG. 2 depicts an enlarged side view of the mirror assembly and trailer coupling mechanism as shown in FIG. 1.
Figure 3:
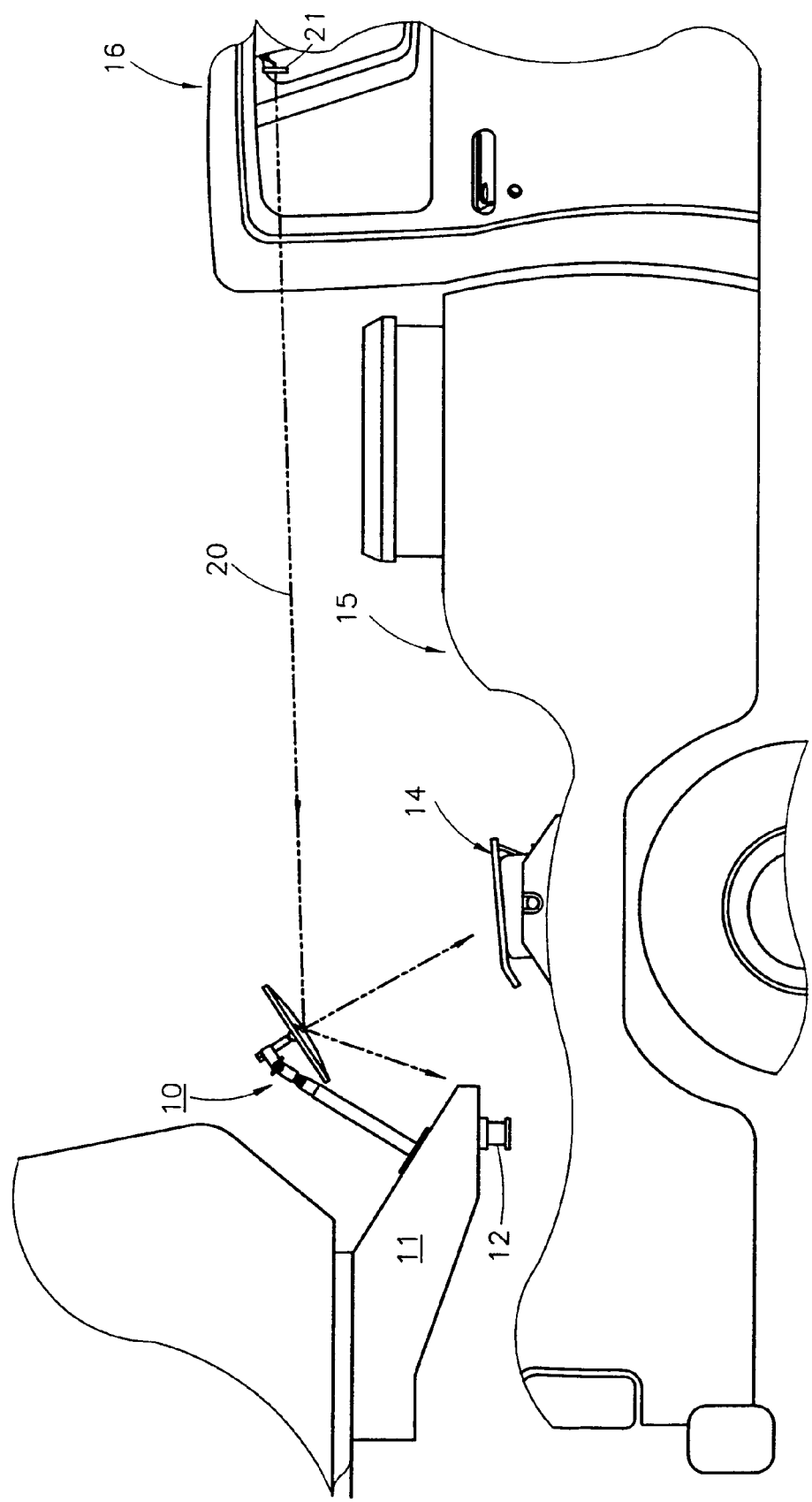
FIG. 3 pictures a side view of the trailer coupling mechanism with the mirror assembly attached, the pickup truck sides cut-away for clarity.

For a better understanding of the invention and its method of use, turning now to the drawings, FIGS. 1, 2 and 3 illustrate in schematic representations preferred mirror assembly 10 as positioned on a trailer fifth wheel coupling mechanism 11. Coupling mechanism 11 includes kingpin 12 which engages v-shaped groove 13 in fifth wheel plate 14 shown as mounted in bed 15 of pickup truck 16. Preferred mirror assembly 10 is thus shown in FIG. 3 whereby sight line 20 from rear view mirror 21 allows the driver (not shown) of pickup truck 16 to carefully observe fifth wheel plate 14 and fifth wheel coupling mechanism 11 simultaneously. With mirror assembly 10 correctly adjusted, a quick, efficient coupling of fifth wheel plate 14 and coupling mechanism 11 can be made.

Figure 4:
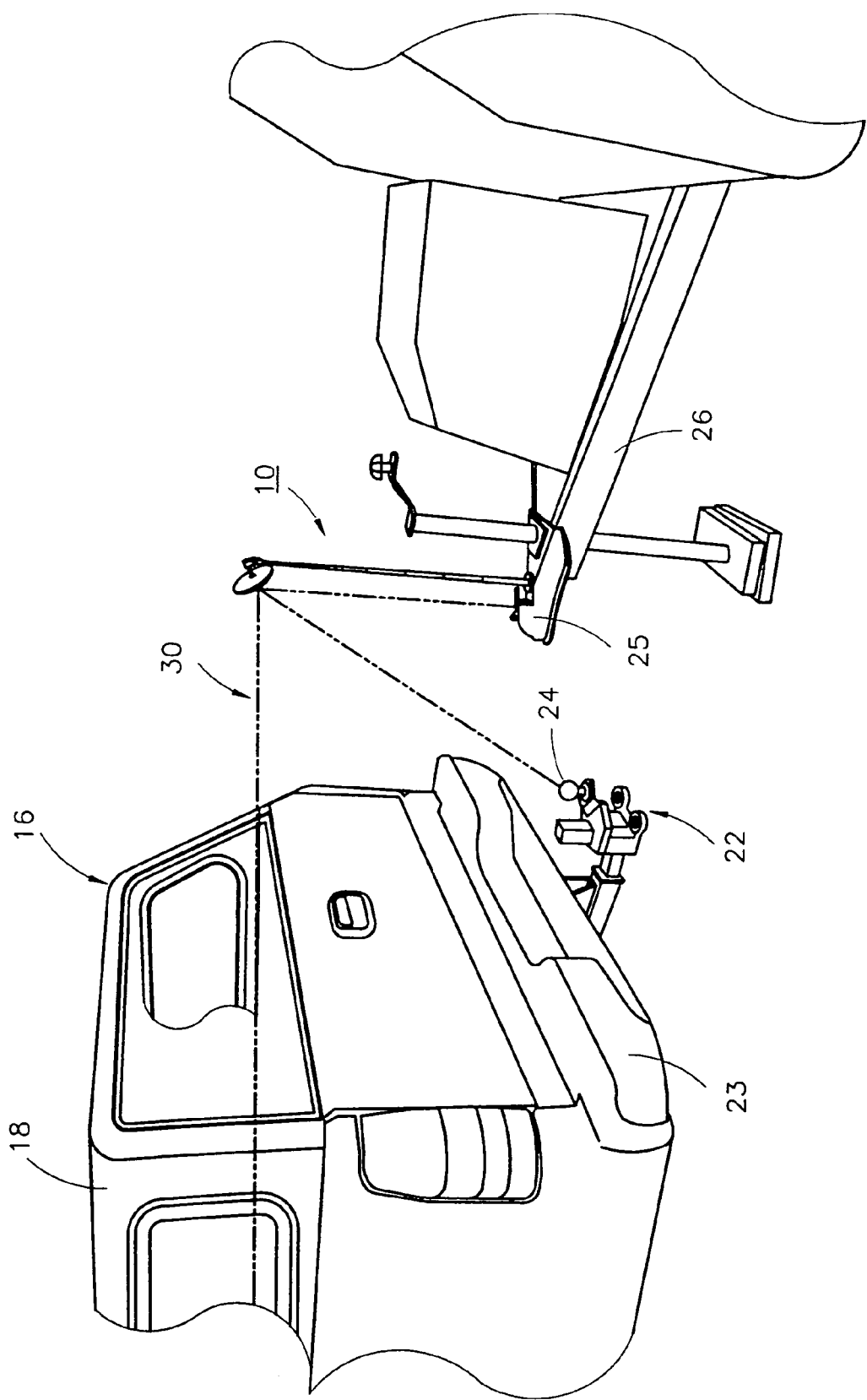
FIG. 4 illustrates the mirror assembly affixed to a trailer tongue prior to coupling with a pickup truck.

In another use of preferred mirror assembly 10, in FIG. 4, pickup truck 16 with camper top 18 is shown with conventional trailer hitch 22 attached beneath bumper 23. Here, hitch ball 24 requires alignment with socket 25 of trailer tongue 26. As seen, sight line 30 from rear view mirror 21 of truck 16 allows the driver during backing of pickup truck 16 to see both hitch ball 24 and tongue socket 25 for quick and efficient coupling.

Figure 5:
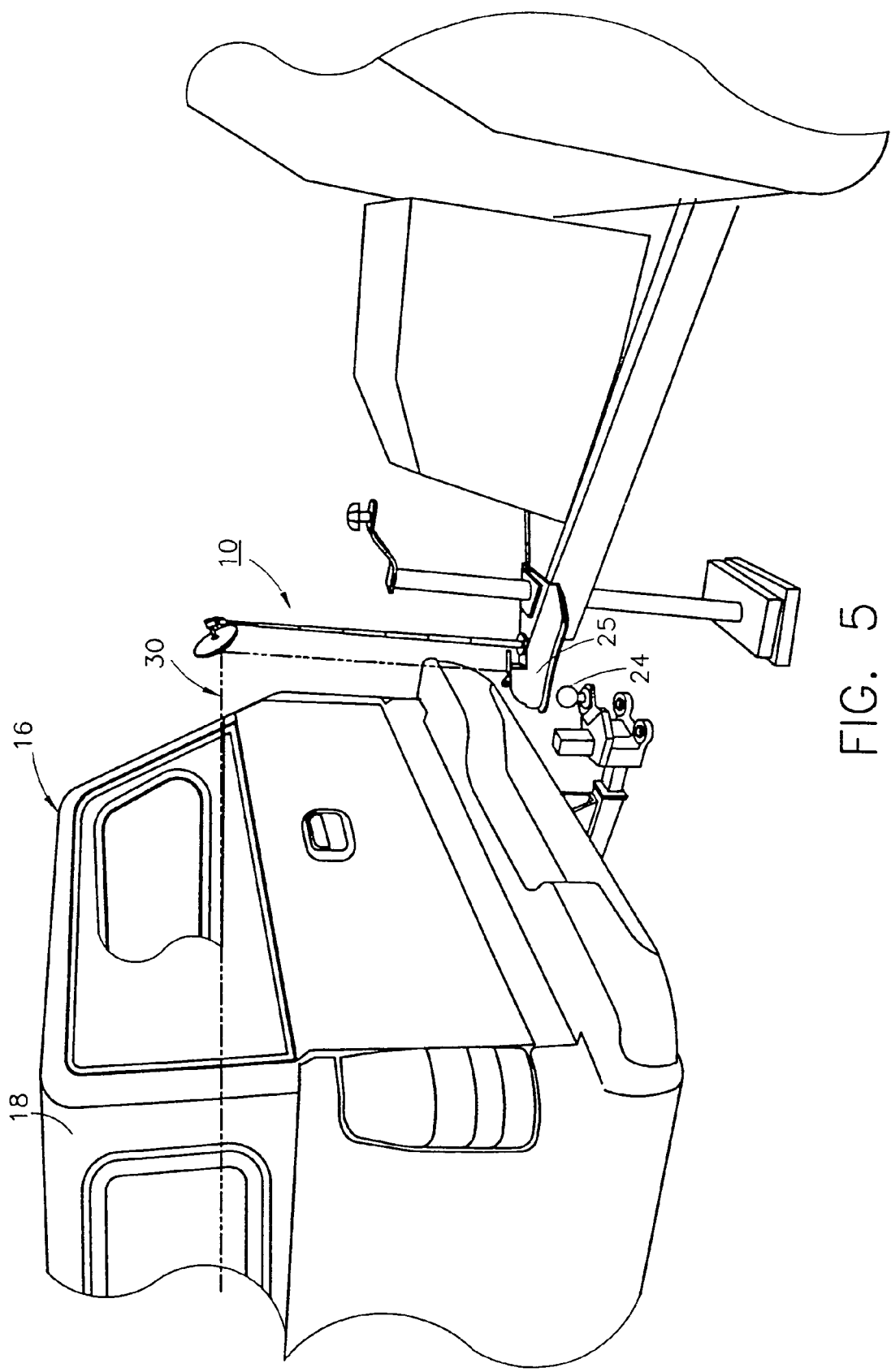
FIG. 5 features the trailer tongue as shown in FIG. 4 but with the pickup truck closer to the trailer tongue.

In FIG. 5 as pickup truck 16 closely approaches socket 25, viewing is minimized as hitch ball 24 is now obscured but socket 25 is clearly visible for coupling purposes.

To maintain the most advantageous mirror position, preferred mirror assembly 10 is shown fragmented in FIG. 6 whereby standard round convex mirror 35 having reflective surface 36 is seen with rear bracket 37 defining socket 38 for reception of spherical end 40 of mirror post 39. Socket 38 and spherical end 40 of post 39 unite to form ball joint 50. Post 39 defines an internal threaded channel 41 for receiving bolt 52. Bolt 52 is positioned through aperture 48 of upper swivel section 46 and into internal channel 41 to maintain mirror assembly 10 thereon. While preferred mirror assembly 10 is shown with a circular shaped mirror, a rectangular or other mirror shape may also be employed.

Seen enlarged in FIG. 7, swivel joint 45 includes inverted upper swivel section 46 having cylindrically shaped trunk 55 with arcuate top 64 and extension 56 attached thereto. Extension 56 includes channel 43 and terminal end 57 having a curved or arcuate shape for rotation contiguous complimentary top 64' of trunk 55' of lower swivel section 47. Extension 56' having channel 49 and arcuate terminal end 57' is likewise contiguous top 64 of trunk 55 when swivel joint 45 is assembled.

Also seen in FIG. 7, threaded member 42 passes through channel 43 in upper section 46 and channel 49 in lower section 47. Channels 43 and 49 are coincidentally aligned upon assembly of swivel joint 45 and threaded member 42 is positioned therethrough and tightened by wingnut 54. Swivel joint 45 allows rotation around threaded member 42. Thus, wingnut 54 can be manually loosened and tightened to allow swivel joint 45 to rotate for realignment as needed.

In FIG. 6 swivel joint 45 is rigidly affixed to telescoping stanchion 60 at upper end 58. Magnetic base 61 is attached to stanchion 60 at lower end 59 for mounting mirror assembly 10 to a metal support, such as trailer tongue 26 as seen in FIG. 4. Stanchion 60 preferably includes seven (7) sections A–G as shown in FIG. 6 although more or less sections may be formed. Also, socket 38 in mirror bracket 37 allows post 39 to pivot mirror 35 to any of a variety of selected horizontal or vertical positions for precise viewing by the vehicle driver.

Thus by allowing mirror assembly 10 to extend, retract, swivel vertically on swivel joint 45 and pivot to an infinite number of positions with ball joint 50, a very precise and efficient mirror position can be obtained and hitch couplings can be better performed.

The illustrations and examples provided herein are for explanatory purposes and are not intended to limit the scope of the appended claims.

I claim:

1. A mirror assembly comprising: a magnetic base, a telescoping stanchion, said stanchion defining a top end and a bottom end, and said bottom end affixed to said base, a swivel joint, said swivel joint attached to the top end of said stanchion, said swivel joint defining an upper section and a lower section, said upper swivel section defining a channel, a mirror post, said mirror post defining a spherical end, and an opposing threaded channel, a bolt, said bolt positioned in said upper swivel section channel and in said mirror post channel for connecting said mirror post to said upper swivel section, a mirror, said mirror defining a ball socket, and said spherical end of said mirror post pivotally contained within said ball socket.

2. The mirror assembly of claim 1 wherein said upper swivel section defines an aperture, said lower swivel section defining an aperture, said upper and said lower section apertures coincidentally aligned, a threaded member, said threaded member positioned within said coincidentally aligned apertures.

3. The mirror assembly of claim 2 further comprises a wingnut, said wingnut attached to said threaded member.

4. The mirror assembly of claim 1 wherein said mirror is convex.

5. The mirror assembly of claim 1 wherein said telescoping stanchion comprising seven (7) sections.

6. A mirror assembly for releasable attachment to a trailer tongue for assistance in coupling the trailer to a towing vehicle, the mirror assembly comprising:
a magnetic base, a telescoping stanchion, said telescoping stanchion defining at least three (3) sections, the bottom end of said stanchion affixed to said magnetic base, a swivel joint, said swivel joint defining an upper section and a lower section, said upper section defining a channel, said lower section attached to said stanchion, said upper and said lower sections each defining an aperture, a threaded member, said threaded member positioned within said upper and said lower section apertures, a wingnut, said wingnut attached to said threaded member for selectively tightening and loosening said threaded member, a mirror post, said mirror post defining a spherical end and an opposing threaded channel, a bolt, said bolt positioned through said upper swivel section channel and in said threaded channel of said mirror post to hold said mirror post to said upper swivel section, a mirror, said mirror defining a ball socket, said mirror post spherical end contained within said ball socket to allow said mirror to be selectively rotated.

7. The mirror assembly of claim 6 wherein said mirror is convex.

8. The mirror assembly of claim 6 wherein said telescoping stanchion defines seven (7) sections.

9. The mirror assembly of claim 6 wherein said mirror is round.

10. The mirror assembly of claim 6 wherein said swivel joint comprises an upper and a lower section, each of said sections defining a cylindrical trunk, an extension, said extension rigidly attached to said trunk, said extension defining an aperture and an arcuate terminal end, said arcuate terminal end of said lower section contiguous said trunk of said upper section, said terminal end of said upper section contiguous said trunk of said lower section wherein said apertures are coincidentally aligned, a bolt, said bolt positioned in said apertures whereby said upper section can rotate around said bolt relative to said lower section.

* * * * *